United States Patent [19]

MacMillan

[11] 4,246,226
[45] Jan. 20, 1981

[54] METHOD OF AND APPARATUS FOR UTILIZING DRY HEATED PULVERULENT MATERIAL TO CURE A TIRE

[76] Inventor: Kenneth T. MacMillan, 347 Hazel St., P.O. Box 557, Macon, Ga. 31202

[21] Appl. No.: 101,556

[22] Filed: Dec. 7, 1979

[51] Int. Cl.² .................................................. B29H 5/02
[52] U.S. Cl. .................................. 264/501; 425/13; 425/18; 425/23; 425/28 R; 425/34 R; 425/40; 425/41
[58] Field of Search ...................... 425/11, 15, 17, 18, 425/28 R, 34 R, 35, 40, 41, 52, 20, 36; 264/26, 36, 326, 316, 501

[56] References Cited

U.S. PATENT DOCUMENTS

| | | | |
|---|---|---|---|
| 1,162,397 | 11/1915 | Price | 425/41 |
| 1,311,613 | 7/1919 | Munger | 425/40 |
| 1,358,068 | 11/1920 | Ferguson | 425/11 |
| 1,481,895 | 1/1924 | Gammeteo | 425/40 X |
| 1,483,857 | 2/1924 | Fitzharris | 425/11 |
| 1,750,613 | 3/1930 | Denmire | 425/35 X |
| 1,767,682 | 6/1930 | Kelly | 425/15 |
| 1,852,886 | 4/1932 | Jones | 425/20 |
| 1,879,194 | 9/1932 | Grange | 425/20 |
| 1,914,853 | 6/1933 | Grange | 425/15 X |
| 2,421,097 | 5/1947 | Lakso | 425/15 X |
| 2,421,099 | 5/1947 | Vogt | 264/30 X |
| 2,822,576 | 2/1958 | Rowe | 425/41 X |
| 3,325,326 | 6/1967 | Schelkmann | 425/18 X |
| 3,883,287 | 5/1975 | Grawey et al. | 425/28 R X |
| 3,884,739 | 5/1975 | Hindin et al. | 425/34 A X |
| 3,917,440 | 11/1975 | Huebert | 425/18 |
| 4,028,168 | 6/1977 | Wolfe | 425/18 X |

*Primary Examiner*—J. Howard Flint, Jr.
*Attorney, Agent, or Firm*—Diller, Ramik & Wight

[57] ABSTRACT

This disclosure includes a novel method of and apparatus for utilizing dry pulverulent heated material for curing a tire by positioning a tire encased in a pervious cover within a chamber, filling the chamber with dry pulverulent heated material, utilizing adjustable heating panels in exterior surrounding relationship to the pulverulent material within the chamber to heat the pulverulent material and thus cure the tire, and providing a circulation system for the pulverulent material for feeding the same into and removing the same from the chamber.

30 Claims, 3 Drawing Figures

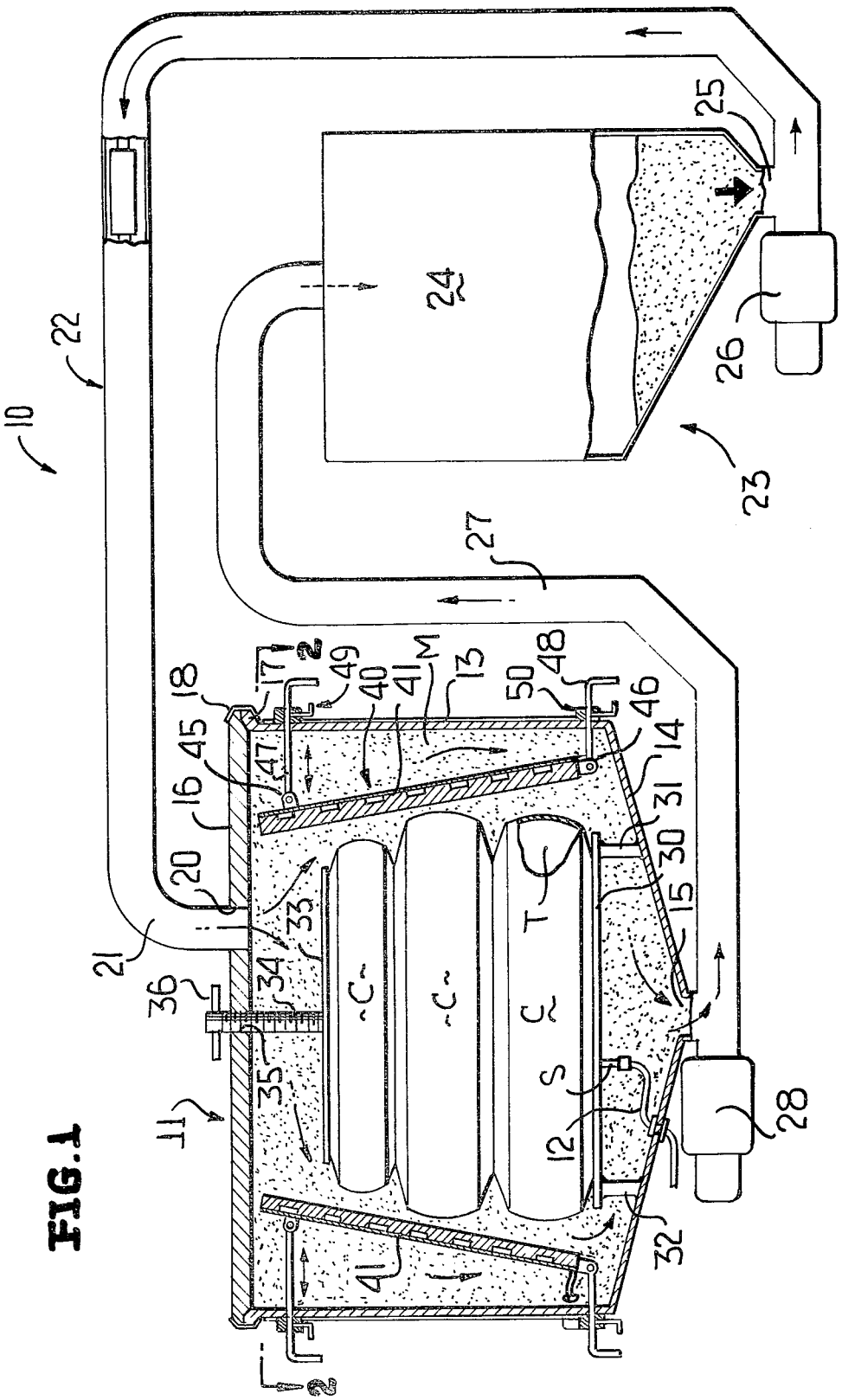

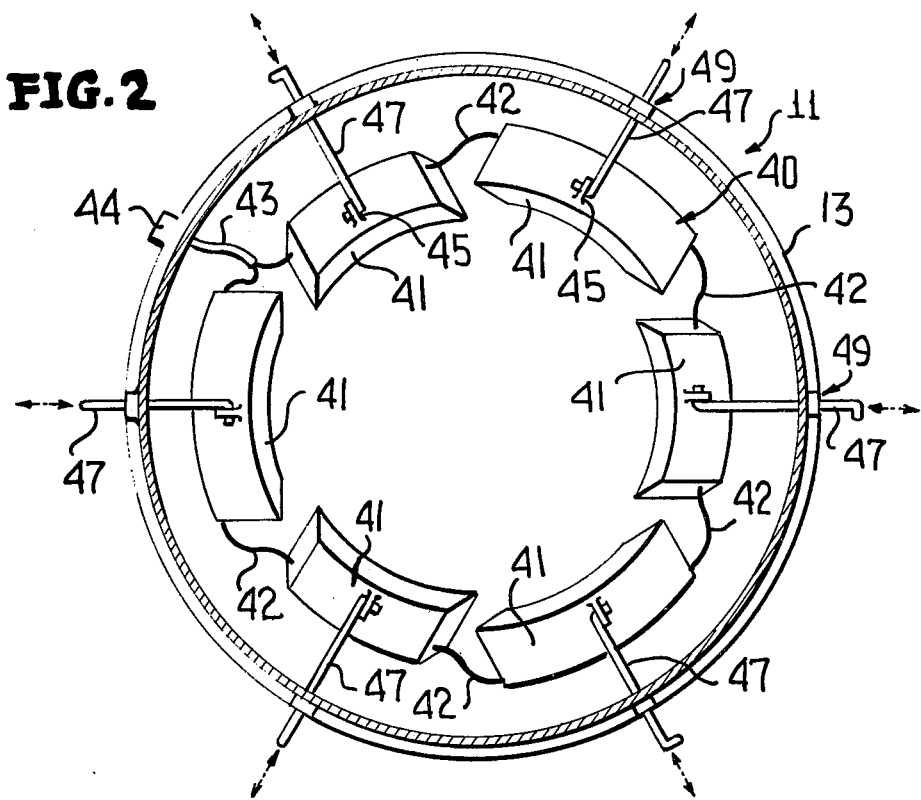
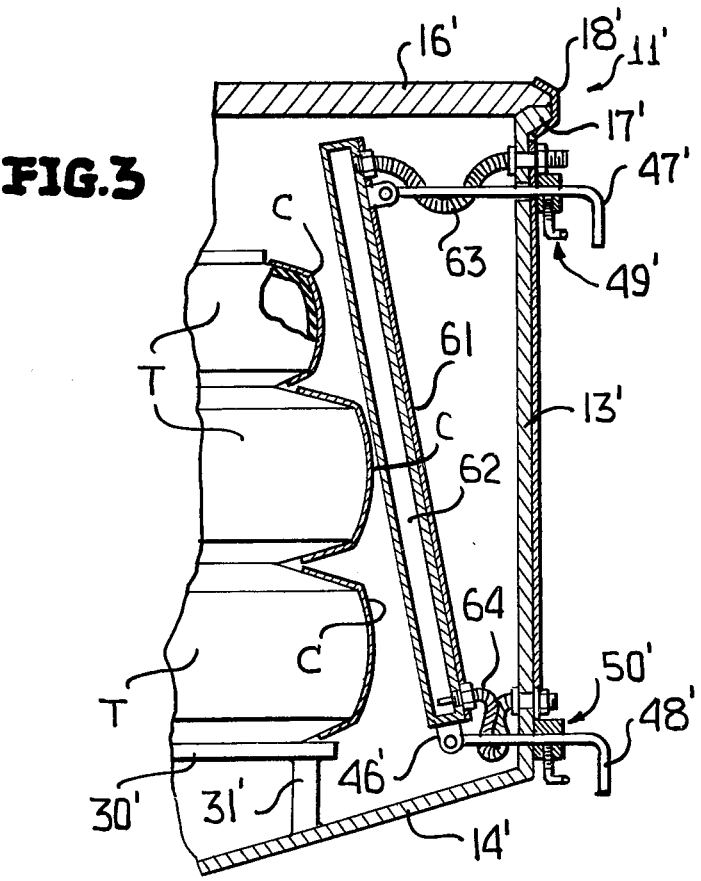

METHOD OF AND APPARATUS FOR UTILIZING DRY HEATED PULVERULENT MATERIAL TO CURE A TIRE

A primary object of this invention is to provide a novel method of and apparatus for curing tires utilizing pulverulent material including a chamber into which at least one tire is placed after being first encased in a pervious cover which completely, intimately and contactingly covers the tire, means for filling the chamber with pulverulent material, means for inflating the tire while positioned within the chamber, means for heating the pulverulent material to a predetermined temperature thereby to cure the tire, and means for removing the pulverulent material from the chamber to allow a cured tire to be removed from the chamber after the curing operation and, of course, to permit the pervious cover to be removed from the tire.

A further object of this invention is to provide a novel mold and/or method of the type aforesaid wherein the heating means includes a plurality of panels in exterior surrounding relationship to the tire encased in the pervious cover, the panels being mounted by pivot means or equivalent means for varying the position thereof relative to the tires to cure the same through heating the pulverulent material within the chamber.

Still another object of this invention is to provide a novel apparatus, mold and/or method of the type aforesaid wherein the pervious cover encasing the tire is a flexible envelope of mesh material which is preferably though not necessarily heat conductive, such as a metallic screen of stainless steel wires of a mesh sufficiently small to preclude the pulverulent material fron entering through the perforations of the cover and thereby contacting and adhering to the tire during the curing thereof.

Yet another object of this invention is to provide a novel apparatus and/or method of the type heretofore set forth wherein the chamber includes a generally conical bottom through which the pulverulent material may be removed, and a circulation system for redirecting the removed pulverulent material back to the chamber with the latter system preferably being enclosed in order that the latent heat of the pulverulent material is not appreciably reduced and thus other tires can be cured in a repetitive and cost-efficient manner.

In accordance with another aspect of this invention, a plurality of tires encased in pervious covers are piled on top of each other within the chamber upon a supporting base and the supporting base and the cover define a chamber within the tire with the associated adjacent tires being in sealed relationship to each other such that the interiors of the tires may be inflated at low pressure during the curing thereof.

With the above and other objects in view that will hereinafter appear, the nature of the invention will be more clearly understood by reference to the following detailed description, the appended claims and the several views illustrated in the accompanying drawings.

IN THE DRAWINGS

FIG. 1 is a schematic view partially in cross section of a novel apparatus including a mold of this invention, and illustrates the manner in which a number of tires each encased in a pervious cover are cured in a chamber containing pulverulent material heated by pivotally mounted panels and a distribution system for the pulverulent material.

FIG. 2 is a sectional view taken generally along line 2—2 of FIG. 1, and illustrates the manner in which the panels can be moved toward and away from each by associated rods to vary the position of the panels relative to tires within the chamber.

FIG. 3 is an enlarged fragmentary sectional view of a modified mold of the invention, and illustrates one of the panels in the form of a steam chamber through which steam and/or hot water and/or vapor may be circulated.

A novel apparatus constructed according to this invention is fully illustrated in FIG. 1 of the drawings and generally designated by the reference numeral 10. The apparatus 10 includes a mold 11 in which one or more tires T each having thereon a flexible, pervious cover C are adapted to be cured in the manner which will be described more fully hereinafter. Each tire T has a stem S of which only one is illustrated for connecting the interiors of the tires T singularly or collectively to a source of pressurized air (not shown) located outside of the mold 11 through suitable conduit means 12. The pervious covers C are preferably though not necessarily constructed from heat conductive metallic material, such as wire mesh screens or flexible aluminum foil having appropriate perforations, but in either event, either the perforations or the mesh of the screen is such that the same will not permit the passage thereto of dry, pulverulent material M housed within the mold 11 during a curing or retreading operation of the tires T. The pulverulent material M is preferably dry sand which is raised to a predetermined temperature to cure the tires T, but in lieu of sand, the material M may be, for example, glass beads, metal shot, coated or uncoated plastic beads having melting temperatures higher than the curing temperature of the tires T, etc.

The mold 11 includes a generally cylindrical or circumferential wall 13, a generally shallow conical bottom wall 14 having an outlet opening 15, and a cover 16 which is removably secured to a flanged terminal upper edge 17 of the wall 13 by conventional locking band 18. The cover 16 includes an opening 20 which is connected to a flexible portion 21 of a conduit 22 which carries the pulverulent material M into the interior (unnumbered) of the mold 11.

The conduit 22 is part of a circulation system which is generally designated by the reference numeral 23, and includes a relatively large storage chamber 24 having an outlet 25 connected to the conduit 22 which also includes a blower 26. Another conduit 27 is connected between the storage chamber or reservoir 24 and the outlet 15 of the mold 11 and further includes therein another blower 28. As is readily apparent by the unnumbered headed arrows associated with the conduits 22,27, the dry pulverulent material M is circulated by the blowers 26,28 from the reservoir 24 through the conduit 22 and the flexible end portion 21 thereof into the mold 11 to fill the same at which time the blower 28 is inoperative. Thereafter the pulverulent material M within the mold 11 is heated for a predetermined time period until the tires T have been cured after which the blower 28 is energized to draw the material M from the mold 11 and circulate the same through the conduit 27 into the reservoir 24. At this time, the blower 26 is inoperative. Thus, in this manner the blowers 26,28 are inoperative during the curing operation and thus the material M is in a static or stationary condition in the mold 11 during the curing of the tires T. However, it may, of course, be desired to circulate the dry pulverulent material M through the mold 11 during the entire time the tires T are being cured, and this can be readily accomplished by the system 23 simply by having both blowers 26,28 energized to continuously circulate the material M from the outlet 15 of the mold 11 through the system 23 and back into the mold 11 through the opening 20 of the cover 16.

The tires T with the pervious covers C thereon are stacked on top of each other in the manner best illustrated in FIG. 1 and they may, of course, be of varying sizes either widthwise or diameterwise, as is represented in the drawings. The lowermost tire (unnumbered) is seated atop a support or plate 30 of a generally circular configuration which in turn is supported above the bottom wall 14 by a plurality of legs 31,32. An upper circular plate 33 is fixed to a screw 34 which is in turn threaded in a threaded opening 35 of the cover 16 and also carries a handle 36. The handle 36 is manually gripped and rotated to advance or retract the plate 33 and thus hold the tires T firmly upon the plate 30. As is best illustrated in FIG. 3, the pervious covers C extend completely across the tread portion of each tire and partially along the sidewalls SW thereof, but not to a point at which adjacent sidewalls of adjacent tires are in contactingly relationship to each other. Thus, adjacent tires are in hermetic sealing relationship along their sidewalls such that air introduced into the interior of the tires through the stem S can pressurize the same and such pressure will be retained in the tires during the curing operation. The plates 30,33 are, of course, similarly in hermetic sealing relationship with the uppermost sidewall SW of the uppermost tire and the lowermost sidewall SW of the lowermost tire, as is most evident in FIG. 3 of the drawings.

Reference is now made to FIGS. 1 and 2 which collectively illustrate heating means generally designated by the reference numeral 40 in the form of a plurality of electric heating panels each of an identical construction and thus indicated by the reference numeral 41. The electric heating panels 41 are interconnected by suitable electric conductors 42 which are in turn led by conductor 43 (FIG. 2) through the wall 13 of the mold 11 and to an appropriate plug 44 which can be connected to a source of electrical energy (not shown).

Each electrical panel 41 has an upper bracket 45 and a lower bracket 46 to which is pivotally connected ends (unnumbered) of sliding rods 47,48 which are mounted for sliding movement in appropriate openings (unnumbered) of the wall 13 of the mold 11. Conventional means 49,50 are associated with respective rods 47,48 for locking the same in any position of relative adjustment. The means 49,50 may be, for example, L-shaped set screws which are threaded in threaded bores opening normal to bores in hubs through which the rods 47,48 pass with the hubs being secured to the wall 13. In this fashion, the rods 47,48 can be moved within the axial bores of the hubs and the set screws locked or unlocked as need be to vary the distance of the electrical heating panels relative to the tires T, as is readily apparent from FIGS. 1 and 2 of the drawings. Thus, the heat generated by the electric heating panels 41 heats the sand or similar pulverulent material M which may, of course, be preheated by conventional sand heater 51 in the conduit 22 or like sand heaters in the conduits 27 and/or the reservoir 24, and the heating is continued until the tires T have been appropriately cured. Thereafter the blower 28 is energized to remove the pulverulent material M from within the mold 11 returning the same to the reservoir 24 after which the tires T can be removed from the mold 11 after the cover 16 has been opened. The pervious covers C are removed from the tires, reused or reapplied to tires which are to be cured, and the process repeated. As was noted earlier, the pulverulent material M within the mold 11 is preferably maintained in a static, non-transient condition during the curing operation, but in keeping with this invention the same may be transient during the entire curing operation by the simultaneous operation of the blowers 28,26.

Reference is now made to FIG. 3 of the drawings which shows a modification of the mold 11 and like primed reference numerals have been applied thereto to indicate structure identical to that shown in FIGS. 1 and 2. The primary difference between the mold 11 of FIG. 1 and the mold 11' of FIG. 3 is the construction of heating panels 61 which instead of being provided with electrically conductive heaters are in effect formed as hollow chambers 62 into which and through which hot water, steam or vapor can be circulated through suitable conduits 63,64. Otherwise the operation of the mold 11' is identical to that described heretofore relative to the operation of the mold 11.

Although only a preferred embodiment of the invention has been specifically illustrated and described herein, it is to be understood that minor variations may be made in the apparatus or in the method of this invention without departing from the spirit and scope of the invention, as defined in the appended claims.

I claim:

1. A mold for curing tires utilizing pulverulent material comprising in combination:
    means for defining an enclosed chamber adapted to have at least one tire placed therein;
    a pervious cover adapted to completely, intimately and contactingly cover a tire adapted to be housed within said chamber;
    means for filling said chamber with pulverulent material;
    means for inflating a tire adapted to be positioned within the chamber to or predetermined pressure;
    means for heating the pulverulent material to a predetermined temperature thereby to cure a tire adapted to be positioned within the chamber; and
    means for removing the pulverulent material from said chamber thereby to allow a cured tire to be removed from the chamber.

2. The mold as defined in claim 1 wherein said heating means comprises at least one heated panel disposed within said chamber in external spaced relationship to said pervious cover.

3. The mold as defined in claim 1 wherein said heating means comprises a heated, generally annular wall disposed within said chamber in external surrounding relationship to said pervious cover.

4. The mold as defined in claim 1 wherein said pervious cover comprises a flexible envelope having perforations therethrough thereby to allow said cover intimately to contact a tire adapted to be positioned within the chamber by preventing air from becoming entrapped between same and said cover, and to preclude said pulverulent material from contacting a tire.

5. The mold as defined in claim 1 wherein said chamber includes a body wall and a conical bottom.

6. The mold as defined in claim 1 wherein said pulverulent material is dry sand.

7. The mold as defined in claim 2 wherein said at least one panel includes adjusting means for allowing same to be movable generally radially inwardly and outwardly toward and away from said pervious cover.

8. The mold as defined in claim 3 wherein said generally annular wall includes adjusting means for contracting and expanding same radially inwardly and outwardly, respectively, toward and away from said pervious cover.

9. The mold as defined in claim 4 wherein said pervious cover is constructed of a metal foil.

10. The mold as defined in claim 5 wherein said filling means is defined in part by a duct which is in communication between a reservoir which contains pulverulent material and an opening in a top wall of said chamber.

11. The mold as defined in claim 5 wherein said removing means is defined in part by a duct which is in communication between an opening at an apex of said conical bottom of said chamber and a reservoir which contains pulverulent material.

12. The mold as defined in claim 7 wherein said adjusting means includes at least one rod which extends through said body wall generally radially inwardly into said chamber and is pivotally attached to a upper portion of said at least one panel and said rod is adapted to be moved generally radially inwardly and outwardly thereby to move said at least one panel.

13. The mold as defined in claim 7 wherein said at least one panel is electrically heated.

14. The mold as defined in claim 7 wherein said at least one panel is heated by hot gas which is circulated therethrough.

15. The mold as defined in claim 8 wherein said generally annular wall is electrically heated.

16. The mold as defined in claim 8 wherein said generally annular wall is heated by hot gas which is circulated therethrough.

17. The mold as defined in claim 10 wherein said filling means includes a blower disposed at an upstream end of said duct which pumps said pulverulent material through said duct by entraining pulverulent material in an air stream produced by said blower.

18. The mold as defined in claim 10 wherein said duct includes additional heating means for heating said pulverulent material as it is being conducted therethrough.

19. The mold as defined in claim 11 wherein said removing means includes a blower disposed at an upstream end of said duct which pumps said pulverulent material through said duct by entraining said pulverulent material in an air stream produced by said blower.

20. The mold as defined in claim 18 wherein said additional heating means is defined by an electric heater disposed within said duct.

21. The mold as defined in claim 18 wherein said additional heating means is defined by a heat exchanger which is adapted to have hot gas circulated therethrough.

22. A method of curing tires utilizing pulverulent material comprising the steps of:
  (a) encasing at least an exterior portion of a tire in a pervious cover;
  (b) placing the tire and associated pervious cover in a chamber;
  (c) at least partially surrounding the encased tire with heated pulverulent material at a temperature sufficient to cure the tire;
  (d) the porosity of the cover being such as to preclude the pulverulent material from passing through the pervious cover and adhering to the tire during the curing of the tire within the chamber;
  (e) maintaining the encased tire in the chamber a sufficient time period at the temperature of step (c) to cure the tire;
  (f) removing the cured encased tire from within the chamber; and
  (g) removing the pervious cover and any pulverulent material adhered thereto from the now cured tire.

23. The method as defined in claim 22 wherein the pulverulent material is heated by generating heat exteriorly about and at a predetermined distance from the encased tire.

24. The method as defined in claim 22 including the step of inflating the encased tire to a predetermined pressure.

25. The method as defined in claim 22 including the step of removing a portion of the pulverulent material of step (c) immediately prior to step (f).

26. The method as defined in claim 22 including the steps of:
  inflating the encased tire to a predetermined pressure; and
  removing a portion of the pulverulent material of step (c) immediately prior to step (f).

27. The method as defined in claim 22 wherein the pulverulent material is heated by generating heat exteriorly about and at a predetermined distance from the encased tire, and selectively varying the predetermined distance to accommodate tires of different dimensions.

28. The method as defined in claim 27 including the step of inflating the encased tire to a predetermined pressure.

29. The method as defined in claim 27 including the step of removing a portion of the pulverulent material of step (c) immediately prior to step (f).

30. The method as defined in claim 27 including the steps of:
  inflating the encased tire to a predetermined pressure; and
  removing a portion of the pulverulent material of step (c) immediately prior to step (f).

* * * * *